United States Patent [19]
Peters

[11] Patent Number: 4,733,570
[45] Date of Patent: Mar. 29, 1988

[54] FLOWMETER

[75] Inventor: Paulus J. Peters, Balgoy, Netherlands

[73] Assignee: Bieo AG, Pfaffikon, Switzerland

[21] Appl. No.: 941,800

[22] Filed: Dec. 4, 1986

[30] Foreign Application Priority Data

Dec. 12, 1985 [CH] Switzerland .......................... 5298/85

[51] Int. Cl.$^4$ ................................................ G01F 1/10
[52] U.S. Cl. .................................................... 73/861.33
[58] Field of Search ........... 73/861.33, 861.35, 861.77, 73/861.83, 861.89, 861.92

[56] References Cited

U.S. PATENT DOCUMENTS

| | | |
|---|---|---|
| 2,209,700 | 7/1940 | Mayo et al. |
| 3,036,460 | 5/1962 | White et al. ...................... 73/861.33 |
| 3,240,063 | 3/1966 | Brueckner ........................ 73/861.83 |
| 3,307,396 | 3/1967 | Griffo . |
| 3,680,378 | 8/1972 | Aurilo et al. ..................... 73/861.83 |
| 3,898,883 | 8/1975 | Kozak et al. . |
| 4,395,919 | 8/1983 | Peters ................................ 73/861.77 |

FOREIGN PATENT DOCUMENTS 0031628 8/1981 United Kingdom .

*Primary Examiner*—Herbert Goldstein
*Attorney, Agent, or Firm*—Lowe, Price, LeBlanc, Becker & Shur

[57] ABSTRACT

A flowmeter with a rotor (21) is provided with blades (22) which are rotatably and coaxially supported in an essentially cylindrical bore (15). The rotor (21) is preceded by a screw-shaped and coaxial distributor (16) imparting a spin to the incident medium before this medium loads the blades (22). The rotation of the rotor (21) is detected in a contactless manner by a light barrier (29, 30, 31). In order to linearize as much as possible the flowmeter characteristics also in the case of impulsive flow, the rotor (21) is provided with blades of which the surfaces (22') loaded with the spinning flow are concave and are curved solely about axes of curvature which are parallel to the rotor axis (15'). Each blade (22) is provided with a slot (28) starting at one end of its side edges. The light beam (29) of the light barrier (29, 30, 31) orthogonally crosses the rotor axis (15') at a distance whereby one count signal is generated for each blade.

3 Claims, 4 Drawing Figures

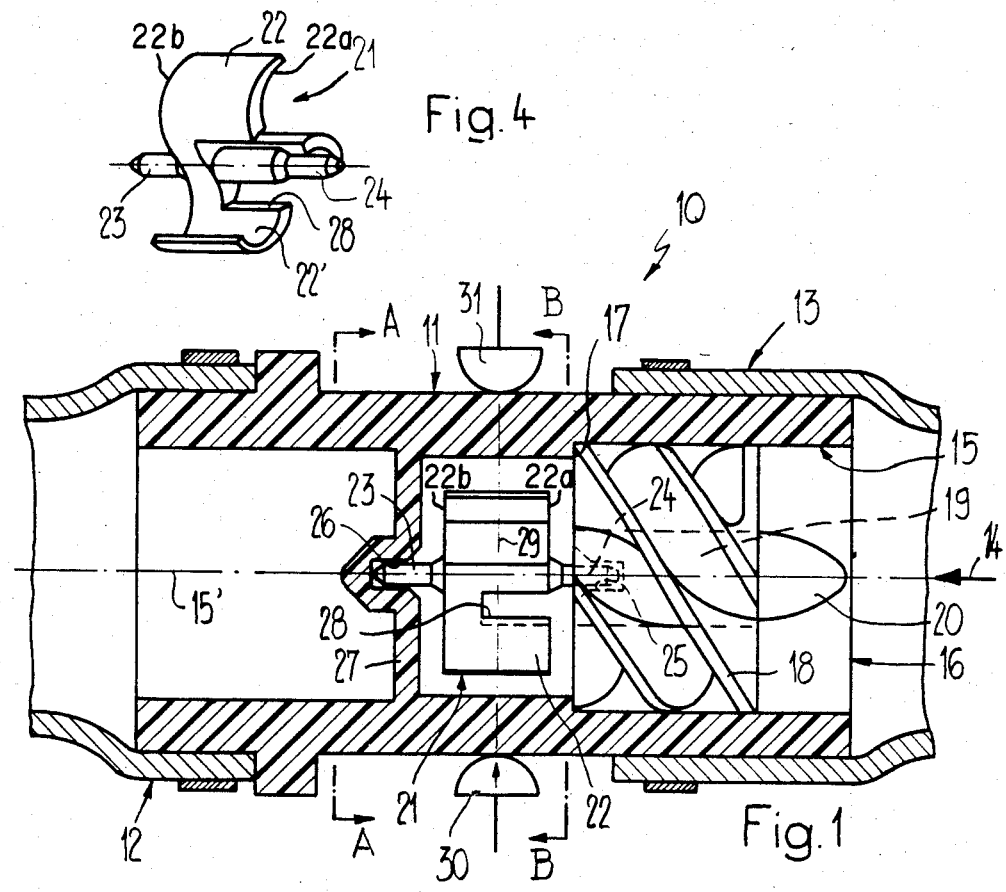
Fig. 4
Fig. 1
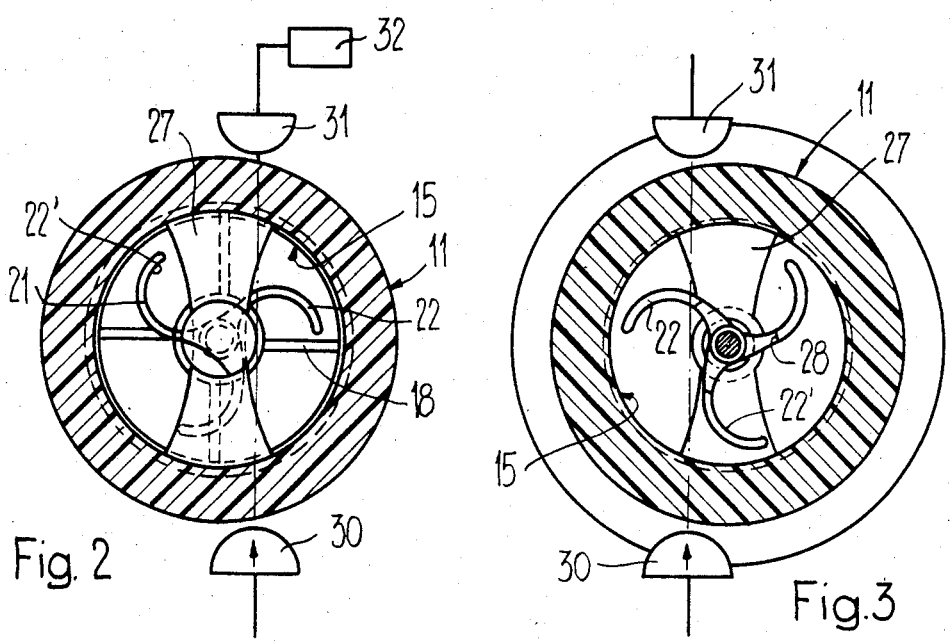
Fig. 2
Fig. 3

FLOWMETER

BACKGROUND

The invention concerns a flowmeter of a type shown in U.S. Pat. No. 2,209,700 as a component of a gasoline pump. In the known flowmeter, the rotor is comparable to the many-bladed wheel of a turbine and is provided at its circumference with an annular disk extending into an annular chamber starting radially from the cylindrical passage with which it communicates. This chamber is bounded by end walls comprising mutually aligned windows. The disk also has two windows. Furthermore, a light barrier is flush with the windows in the end walls, its beam being parallel to the rotor axis. Upon every revolution of the rotor, one of the windows in the annular disk moves past the windows in the end walls and thereby releases the light barrier beam to generate a count signal.

The known flowmeter suffers from several drawbacks. Its response is comparatively sluggish because the rotor must overcome the hydraulic friction between the annular disk on one hand and the two end walls of the chamber on the other, both when being set into and when continuing its rotation. The sluggishness of the known flowmeter furthermore degrades its accuracy if the flow must be suddenly stopped because the comparatively large mass of the rotating rotor plus annular disk causes the latter to go on rotating somewhat even when the liquid flows no longer. These drawbacks of the known flowmeter further are the cause of its characteristics being hardly linear in the sense of the number of rotor revolutions being rigorously proportional to the flow quantity. Such drawbacks, however, are of little significance in the known flowmeters because the flow quantity as a rule varies only within relatively narrow limits in gasoline pumps.

Moreover, the known flowmeter is not highly precise because only two count signals are generated for each revolution, each being essentially sinusoidal. Lastly, the known flowmeter is unsuitable for very small flow rates because its dimensions cannot be shrunk at will.

Accordingly, it is the object of the invention to so design a flowmeter of the initially cited species that the mentioned drawbacks are avoided and that the flowmeter can be made so small that flow rates of about 0.5 liters per hour still can be measured very accurately.

SUMMARY OF THE INVENTION

In accordance with the invention, the very simple shape of the rotor allows extensive miniaturization and hence reduction in inertia, further as many count signals are generated for each rotor revolution as there are blades on it. Appropriately, this rotor is made integrally of plastic. As the slot in the blades starts at one of the side edges, so that it lacks a contour closing on itself, there is no danger either of a gas bubble entrained by the medium sticking in or on the rotor that might falsify the light beam.

Further details are listed in the description below of an illustrative embodiment of the flowmeter.

BRIEF DESCRIPTION OF THE DRAWING

FIG. 1 is a longitudinal section of a flowmeter inside a hose, shown on a scale of about 10:1, FIG. 2 is a section along line A—A of FIG. 1, FIG. 3 is a section along line B—B of FIG. 1, and FIG. 4 is an isometric view of an embodiment of the rotor.

DETAILED DESCRIPTION OF THE PREFERRED EMBODIMENT

The flowmeter 10 shown in FIGS. 1–3 comprises a housing 11 in the form of a pipe stub made of a clear material, for instance glass-clear plastic. A hose 12, 13 is connected to both ends of the housing 11, illustratively the fuel line to an internal combustion engine. A liquid medium flows through the hose 12, 13 and the housing 11 in the direction of the arrow 14. A distributor 16 is mounted in press-fit manner in the essentially cylindrical bore 15 and rests downstream against a shoulder 17 formed in the bore 15. The distributor 16 assumes the shape of a four-threaded worm, each thread 18 projecting radially from a core 19 and extending until touching the inside wall of the bore 15. Each thread covers about 180 degrees. The core 19 extends through the upstream end face of the distributor 16 to form a streamlined body 20. In this embodiment, the distributor 16 divides the incident medium into four partial flows which are accelerated because of the lesser bore crosssection in the region of the distributor 16 and are made to spin. The distributor also may comprise fewer or more than four threads and these furthermore may cover more than 180 degrees. What is essential is that the distributor 16 shall impart a spin to the incident medium. Again, the distributor 16 appropriately is made integrally of plastic.

The distributor is followed by a rotor 21 with three blades 22. FIGS. 2 and 3 show that essentially the blades 22 have the same thickness from their roots to their tips and that they curve about axes of curvature parallel to the longitudinal axis 15' of the bore. Accordingly, each blade 22 has a concave surface 22' on which is incident the spinning medium. Each blade has a leading edge 22a and a trailing edge 22b. See FIGS. 1 and 4. One shaft tip 23, 24 each projects beyond the end faces of the rotor 21 and acts as its journal. The upstream shaft tip 24 enters with some play a borehole 25 in the downstream end of the core 19 and the downstream shaft tip 23 also with some play enters a blind hole 26 at the center of a cross-bar 27 attached to the bore 15 and diametrically crossing it. The shaft tips 23 and 24 preferably are made of plastic and integral with the blades 22. Be it borne in mind that to achieve as low a friction as possible in the rotor 21, this rotor is supported both axially and radially with some play. Further below, a significant phenomenon taking place when operating the flowmeter will be discussed.

Each of the blades 22 comprises a continuous slot 28 starting at its end side. These slots 28 act as "windows" for a light barrier 29 (FIG. 3) extending from a light source, for instance a light emitting diode 30 and a light sensor, for instance a photo-transistor 31. In the flowmeter shown therefore the light beam is momentarily passed three times per each revolution of the rotor 21. As schematically indicated in FIG. 2, the signals from the photo-transistor 31 are fed to a test instrument 32 which in principle can be a frequency meter but which shall directly indicate the flow per unit time, that is, the flow rate, or else it may also be an integrating (and resettable) counter displaying the entire quantity of flow. It is important that in order to be responsive even to minute flow quantities, the inertia of the rotor 21 be minimized. After the medium has flowed past the rotor 21, it must flow around the cross-bar 27. Now it was found that when two of the four partial flows leaving the distributor 16 are more or less frontally incident on the cross-bar 27, contrary to expectation the rotor 21 is not forced by means of its downstream shaft tip 23 in the direction of the axial component of flow as deep as would be possible into the borehole 26. On the contrary, the rotor 21 rotates axially in a somewhat floating manner. One is prompted to explain this phenomenon by the partial flows frontally incident on the crossbeam 27 acting in the course of their "evasive maneuvers" around the cross-beam 27 on the downstream end side of the rotor 21 opposite the overall direction of flow. It was ascertained furthermore that this phenomenon is the more pronounced the larger the flow rate.

It is not mandatory that the slots 28 start at the upstream end of the blades 22. They also may start at the downstream end or they may merely be formed by holes transmitting the light barrier 29. However, the embodiment shown enjoys the empirically confirmed advantage that any gas bubbles entrained by the liquid cannot lodge in the slots 28 whereby they would falsify rotor rotation and/or the function of the light barrier 29.

Experiment has shown that the feature of the shown flowmeter 10 deviate from ideal linearity only by about 2% in a range of 1-50 (arbitrary units for flow rates) regardless of impulsive flow or impulse-free flow. Lastly the shown flowmeter is singularly simple to build and assemble.

I claim:

1. A flowmeter for measuring flowing media comprising:

a rotor having blades and an axis of rotation;
means for rotatably and coaxially mounting said rotor within a substantially cylindrical bore;
a screw shaped stream distributor coaxially and stationarily mounted within said bore upstream of said rotor;
said blades having concave loaded surfaces;
said stream distributor dividing the incident medium into partial flows and imparting to the partial flows a spin;
said partial flows having a spin impinging on said concave loaded surfaces of said blades;
a light source for transmitting a light beam to a light receiver;
said light beam being repeatedly momentarily interrupted by the rotating rotor;
said light beam crossing said axis of rotation substantially orthogonally;
each of said concave loaded surfaced being curved exclusively about axes of curvature parallel to said axis of rotation;
each of said blades having side edges and comprising a slot extending parallel to said axis of rotation and beginning at one of said side edges;
and said slot forming a passage for briefly transmitting said light beam from said light source to said light receiver when said rotor is rotating.

2. The flowmeter of claim 1 wherein the slot begins at the leading edge of each blade.

3. The flowmeter of claim 1 wherein the rotor has three blades and is intragally made of plastic.

* * * * *